(12) United States Patent
Balay et al.

(10) Patent No.: US 11,430,173 B2
(45) Date of Patent: Aug. 30, 2022

(54) METHOD FOR MODIFYING THE RENDERING OF A REGION OF A 3D SCENE IN AN IMMERSIVE ENVIRONMENT

(71) Applicant: DASSAULT SYSTEMES, Velizy Villacoublay (FR)

(72) Inventors: Arnaud Balay, Sophia Antipolis Biot (FR); Jason Labiod, Sophia Antipolis Biot (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 17/124,148

(22) Filed: Dec. 16, 2020

(65) Prior Publication Data
US 2021/0192828 A1 Jun. 24, 2021

(30) Foreign Application Priority Data
Dec. 23, 2019 (EP) .................................... 19306750

(51) Int. Cl.
*G06T 15/00* (2011.01)
*G06F 3/01* (2006.01)
*G06F 3/04815* (2022.01)

(52) U.S. Cl.
CPC ............ *G06T 15/005* (2013.01); *G06F 3/012* (2013.01); *G06F 3/014* (2013.01); *G06F 3/04815* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 2015/0193107 A1* | 7/2015 | Schweisinger | G06F 3/0304 715/784 |
| 2016/0171771 A1* | 6/2016 | Pedrotti | G02B 27/017 345/633 |
| 2018/0004283 A1* | 1/2018 | Mathey-Owens | G06F 3/017 |
| 2018/0120944 A1* | 5/2018 | Wang | G06F 3/013 |

OTHER PUBLICATIONS

Extended European Search Report dated Jun. 26, 2020 in European Application No. 19306750.1.
Mathias Kölsch, et al. "Multimodal Interaction with a Wearable Augmented Reality System", Computer Graphics and Applications, vol. 26, No. 3, May 1, 2006, pp. 62-71, XP055248298.

* cited by examiner

*Primary Examiner* — Yingchun He
(74) *Attorney, Agent, or Firm* — Oblon, McClelland, Maier & Neustadt, L.L.P.

(57) ABSTRACT

A computer-implemented method for modifying the rendering of a region of a 3D scene in an immersive environment, the region being computed based on a 3D position of a head tracking device and a 3D position of at least one hand tracking device.

17 Claims, 5 Drawing Sheets

METHOD FOR MODIFYING THE RENDERING OF A REGION OF A 3D SCENE IN AN IMMERSIVE ENVIRONMENT

CROSS-REFERENCE TO RELATED APPLICATIONS

This application claims priority under 35 U.S.C. § 119 or 365 to European Application No. 19306750.1, filed Dec. 23, 2019. The entire contents of the above application(s) are incorporated herein by reference.

FIELD

The disclosure pertains to the field of computer programs and systems, and specifically to the field of product design and exploration in an immersive environment, and also to the fields of simulation and video games, where exploration is useful.

BACKGROUND

Headways which have been made in the rendering of the environment make the experience more and more realistic. In particular, a virtual reality headset allows the user to visualize the 3D space where he is immersed, through a virtual camera. The position of the head is tracked thanks to the virtual reality headset, so that the orientation of the head of the user corresponds to the orientation in the immersive environment. With one or several handheld motion-tracked controllers, the user can interact with the environment.

However, in a very congested environment, the field of view of the virtual camera may be partially obstructed, which makes the virtual reality experience less enjoyable. For example, considering the scenario of exploring a wiring closet, tens of cables obstruct the field of view of the camera. The congestion of the wiring closet prevents the user from discovering the cables and authoring them, and also from manipulating them.

Furthermore, in immersive environments, in particular in some video games, the 3D scene is a small room. In that case, there may be a lot of objects in front of the virtual camera.

SUMMARY

A first way to deal with the obstruction of the field of view consists in defining a frustum. This solution is said to be "user centric", since the frustum is associated to the user. The frustum also speeds up the rendering of the 3D scene, since only a part of it is rendered. Hereafter, the frustum refers to the region of space which may be rendered for the user. The frustum is a truncated pyramid. The planes which cut the viewing frustum perpendicular to the viewing direction of the virtual camera are called the "near clipping plane" and the "far clipping plane". The frustum is bounded by the near clipping plane on the side of the virtual camera and by the far clipping plane on the opposite side. The angles between opposite lateral faces of the frustum correspond to the natural field of view of a human. Objects which are not in the frustum are not rendered. In particular, objects which are located between the virtual camera and the near clipping plane are not rendered.

Therefore, it is up to the developer or to the user of the software to set the near clipping plane at an optimum distance relative to the virtual camera: if the near clipping plane is too close to the virtual camera, the view of the user will be obstructed, and if the near clipping plane is too far from the virtual camera, too many objects will be removed. Thus, setting the depth of the near clipping plane is not flexible and adaptive.

Moreover, the axis of the virtual camera is normal to the near clipping plane. An object which is out of the frustum, close to the near clipping plane, on the axis of the virtual camera, enters the frustum when the user moves his head. Depending on the orientation of the head, the object, or a part of it, will alternatively be rendered or not, which may be confusing for the user.

A second way to deal with the obstruction of the field of view consists in manually selecting parts of the object which is to be explored, so as to change their properties. This solution is said to be "product centric", since the properties of the objects are modified.

Returning to the example of the wiring closet, the user ghosts the first layer of cables, and repeats the operation of ghosting for the next layers, until he has reached the layer he is interested in. Hereafter, ghosting refers to modifying the rendering of an object, in order to see through it. Ghosting also makes the object non selectable. Ghosting may be done for example by modifying the opacity of the object, or by rendering only the edges of the object.

The ghosting operations are made manually: the cursor, directed by the user, hovers over a part of the object, then he presses and releases the "tab" button (or another button, depending on the way the function has been implemented), which ghosts the part of the object. If the user wants to ghost another part of the object, he reiterates the operation of pressing the "tab" button when the cursor hovers over the part, then releasing the button, and so on until the user has terminated the exploration of the object. In order to unghost the part (i.e. to remove the ghost effect), the user moves the cursor out from the ghosted part. It may be noted that the user may hide an object instead of ghosting it. Hereafter, hiding refers to not rendering it.

Manually ghosting objects has several drawbacks. Firstly, it is not efficient when trying to visualize a congested 3D scene, since it would be required to ghost every object in front of the eyes of the user. Secondly, exploring an object in depth with many layers involves as many presses on the button, which is cumbersome. Thirdly, if the user unghosts a part that he sees in front of him, he will not be able to unghost the parts which are behind the unghosted part: the unghosting operations must be done according to the reverse order of the ghosting operations.

Therefore, there is a need for providing a computer-implemented method for adaptively exploring the region of a 3D scene in an immersive environment, while reducing the exploration time.

One embodiment includes a computer-implemented method for modifying the rendering of a region of a 3D scene in an immersive environment characterized in that the region is computed based on a 3D position of a user's head tracking device and a 3D position of at least one user's hand tracking device.

In an embodiment, the region comprises a convex volume which has a plane part which fits a near clipping plane of a virtual camera frustum rendering a part of the 3D scene, said convex 3D volume extending along a segment which is defined by the 3D position of the head tracking device and by the 3D position of the hand tracking device.

In an embodiment, the convex volume comprises a truncated cone or a revolution cylinder.

In an embodiment, the convex volume has a curved shape surrounding partially the hand tracking device, opposite to the plane part, and being spaced apart from the hand tracking device by a non-null safety margin.

In an embodiment, the method comprises:
a step of receiving a user input of actuating the hand tracking device, and
a step of modifying the rendering of the region as long as the hand tracking device is being actuated.

In an embodiment, the method comprises:
a step of receiving a user input of actuating a second hand tracking device,
a step of computing the distance between the 3D position of the hand tracking device, referred to as first hand tracking device, and the 3D position of the second hand tracking device, and
a step of widening or thinning the convex volume across the segment, respectively by increasing or reducing said distance.

In an embodiment, the step of receiving a user input of actuating a second hand tracking device comprises receiving a command of pressing and holding a button of the second hand tracking device, and the step of widening or thinning the convex volume is carried out while the button of the second hand tracking device is being pressed.

In an embodiment, the step of receiving a user input of actuating a second hand tracking device comprises receiving a command of pressing then releasing a button of the second hand tracking device; and the step of widening or thinning the convex volume is carried out after receiving another command of pressing then releasing said button.

In an embodiment, the convex 3D volume is transformed into a sphere if the distance between the 3D position of the first hand tracking device and the 3D position of the second hand tracking device exceeds a threshold distance, said sphere having its center at the 3D position of the head tracking device, and having its radius equal to the distance between the 3D position of the head tracking device and the 3D position of the first hand tracking device.

In an embodiment, the region comprises 3D objects having a minimum bounding box which intersects with the convex volume.

In an embodiment modifying the rendering of a region comprises ghosting said region.

Alternatively, modifying the rendering of a region comprises hiding said region.

Another embodiment relates to a computer program product, stored on a computer-readable data-storage medium, comprising computer-executable instructions to cause a virtual reality system to carry out the aforementioned method.

Another embodiment relates to a computer-readable data-storage medium containing computer-executable instructions to cause a virtual reality system to carry out the aforementioned method.

Another embodiment relates to a virtual reality system comprising a processor coupled to a memory, the memory storing computer-executable instructions to cause the virtual reality system to carry out the aforementioned method, a head mounted display device having a head tracking device, and at least one hand-held controller having a hand tracking device.

BRIEF DESCRIPTION OF THE DRAWINGS

Additional features and advantages of the disclosure will become apparent from the subsequent description, taken in conjunction with the accompanying drawings.

DETAILED DESCRIPTION

Figure 1:
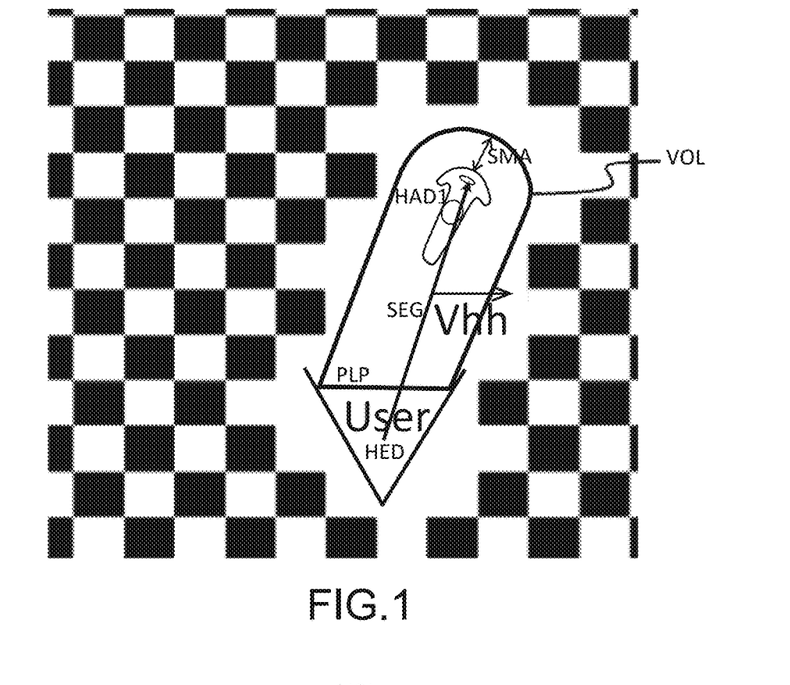
FIGS. 1 and 2 illustrate a top view of the user in an immersive environment; the user is equipped with a head tracking device and a first hand tracking device.

FIG. 1 illustrates a first top view of the user in an immersive environment. The user is equipped with a virtual reality headset and at least one wireless handheld controller. The virtual reality headset and the wireless handheld controller are part of a virtual reality system. One example of a virtual reality system is "HTC Vive"™.

The headset and the at least one handheld controller are located in the coordinate system of the virtual environment. Head tracking of the headset is performed by a head tracking device HED, in different ways: through cooperating with base stations, by surface detection, markers, environmental recognition, gyroscopic control units, computer vision. Similarly, hand tracking of the at least one handheld controller is also performed by a hand tracking device HAD1, in different ways: through cooperating with base stations, by surface detection, markers, environmental recognition, gyroscopic control units, computer vision.

In what follows, it will be considered that the virtual reality headset comprises the head tracking device HED and that the handheld controller comprises the hand tracking device HAD1.

Referring now to FIG. 1, the exact 3D position of the head of the user corresponds to the point which is between the eyes (Cyclops' eye), equidistant to both eyes. The point which is between the eyes is computed by the software layer of the head tracking device HED. The exact position of the hand of the user is computed based on the 3D position of the hand tracking device HAD1. The position of the hand is computed by the software layer of the hand tracking device HAD1.

Figure 2:
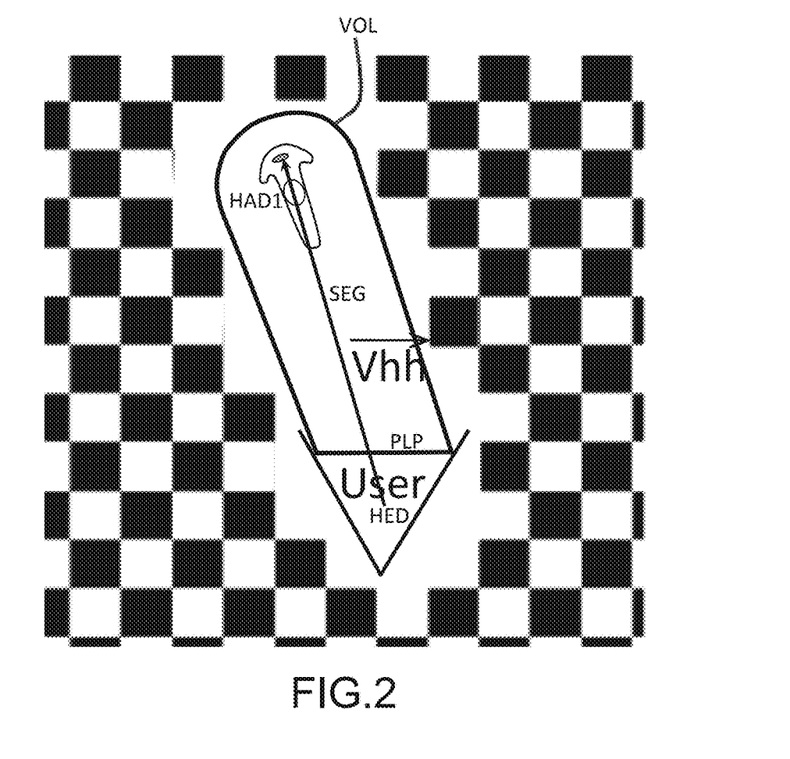

As illustrated by FIGS. 1 and 2, the rendering of a region which is based on the 3D position of the user's head tracking device HED and the 3D position of at least one user's hand tracking device is modified. In FIG. 1, the user holds the hand tracking device HAD1 in front of him, on his right. In FIG. 2, the user holds the hand tracking device HAD1 in front of him, on his left.

Therefore, when the user moves his hand, the region, where the rendering is modified, is computed in real time. The user easily and adaptively sets the depth region for which the rendering is to be modified.

Advantageously, modifying the rendering of a region comprises ghosting it, or hiding it. Thus, the user can see the 3D scene through the ghosted or hidden region, while visualizing the context around the ghosted or hidden region. When a region is ghosted or hidden, ray tracing is performed without taking the region into account, thereby proving realistic colors of the scene.

The user may determine in advance, for example by a setting in a menu, what kind of modification of the rendering is to be performed: hiding a region, or ghosting it.

In an embodiment, the region comprises a convex volume VOL. In particular, the convex volume VOL has a plane part PLP which fits a near clipping plane of a virtual camera frustum rendering a part of the 3D scene. As mentioned above, the near clipping plane marks out the virtual camera frustum one the side of the head tracking device HED, and the far clipping plane marks out the virtual camera frustum on the opposite side. Contrary to the known methods of modifying the depth of the near clipping plane, the invented method does not alter the depth of the near clipping plane. More generally, the invented method is performed independently of the dimensions/shape/depth of the frustum of the virtual camera.

The convex volume VOL extends along a segment SEG which is defined by the 3D position of the head tracking device HED and by the 3D position of the hand tracking device HAD1. By "extending along", it is meant that the convex volume VOL may have any shape provided that a segment between the 3D position of the head tracking device HED and the 3D position of the hand tracking device HAD1 is included in the convex volume VOL. Thus, modifying the rendering of a region comes to hand intuitively, and the user simply "digs" in a 3D object in order to explore it. He does not need to press a dedicated button on the keyboard, as many times as the number of layers to ghost. The vector $\vec{Vhh}$ corresponds to the vector between the 3D position of the head tracking device HED and the 3D position of the hand tracking device HAD1.

In FIGS. 1 and 2, the convex volume VOL comprises a revolution cylinder, having an axis which substantially corresponds to the segment SEG. Alternatively, the convex volume VOL comprises a truncated cone, also referred to as a frustum. However, the latter should not be confused with the frustum of the virtual camera which renders the 3D scene. In the case of a truncated cone, the convex volume VOL has the shape of a "torchlight".

In an embodiment, the convex volume VOL has a curved shape surrounding partially the hand tracking device HAD1, opposite to the plane part PLP. In other words, at the extremity of the cylinder or at the extremity of the truncated cone, opposite to the plane part PLP, the convex volume VOL is not plane, but rather curved, in order to surround the end part of the hand tracking device HAD1.

The convex volume VOL may also comprise, in the aforementioned curvature, a safety margin SMA between the hand tracking device HAD1 and the end of the convex volume VOL which is opposite to the plane part PLP, so that the curved portion and the hand tracking device HAD1 might be spaced apart from each other. In an immersive environment, the hand tracking device, i.e. the controller, is often made visible, by modeling it. If there is no safety margin, the user's field of view may be obstructed by the hand tracking device, while exploring an object. A non-null safety margin SMA enhances the visibility of the region for which the rendering is modified.

The value of the safety margin SMA may be proportional to the length of the segment SEG. Alternatively, it may be exponential. According to another alternative, as long as the arm is close to user's head (the arm is folded), the value of the safety margin SMA is fixed. Then, when the arm extends from a half extension to a full extension, the value of the safety margin SMA rises linearly or exponentially. The same applies for the contraction movement.

The modification of the rendering of the region is controlled by the user. In an immersive environment, the hand tracking device receives a user input of actuating it. The user input may be, for example, a press and hold on a button of the hand tracking device. Then, the modification of the rendering of the region is performed as long as the hand tracking device is being actuated, for example as long as the button is pressed. Consequently, whenever the user releases the button, the 3D scene is displayed, without any ghosting or hiding or the region. The invented method is user friendly, since the user needs to actuate only one button so as to modify the rendering of the region.

Figure 3:
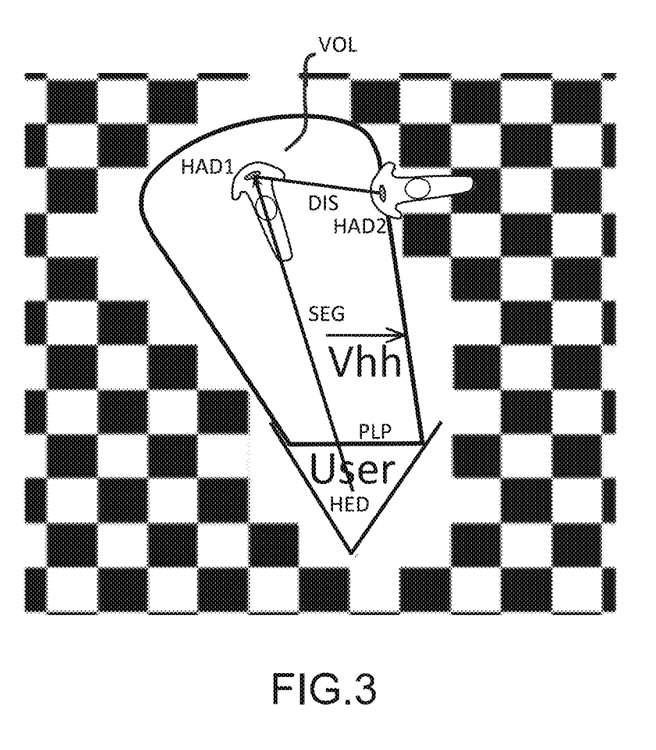
FIG. 3 illustrates a top view of the user in an immersive environment; the user is equipped with a head tracking device a two hand tracking devices.

FIG. 3 illustrates another embodiment of the invented method, in which two hand tracking devices are required. The aforementioned hand tracking device HAD1 is referred to as first hand tracking device HAD1. In addition, a second hand tracking device HAD2 is used. In the example of FIG. 3, the user carries the first hand tracking device HAD1 on the left hand, and the second hand tracking device HAD2 on the right hand. Of course, the first hand tracking device HAD1 could be carried on the right hand, and the second hand tracking device HAD2 on the left hand, without affecting the invented method.

When a user input of actuating the second hand tracking device HAD2 is received, the distance DIS between the 3D position of the first hand tracking device HAD1 and the 3D position of the second hand tracking device HAD2 is computed. Then, when the user increases or reduces the distance DIS, the convex volume VOL is respectively widened or thinned across the segment SEG. By "widening the convex volume VOL across the segment SEG", it is meant that the cross section increases. By "thinning the convex volume VOL across the segment SEG", it is meant that the cross section decreases.

By adapting the distance DIS, the user can adapt the region to the context of the 3D scene, and also to the object which is to be explored. For example, in order to explore the gear of a gearbox, a small distance DIS may be sufficient, whereas in order to explore an axis which crosses the entire gearbox, a high distance DIS would be better.

If the convex volume VOL is a revolution cylinder, actuating the second hand tracking device HAD2 transforms the revolution cylinder into a truncated cone. Then, if the user keeps on increasing the distance DIS, the vertex angle (i.e. the cone angle when the cone is not truncated) increases. If the convex volume VOL is initially a truncated cone, when increasing the distance DIS, the vertex angle also increases.

Therefore, the user can modify the region to be ghosted or hided, not only while playing with the depth of the region starting from the near clipping plane, but also while playing with the angle of aperture of the region. In the meantime, the user can modify the direction of the segment SEG, with the first hand tracking device HAD1.

In order to widen or thin the convex volume VOL, the user presses and holds a button of the second hand tracking device HAD2, and the widening or thinning of the convex volume VOL is performed while the button of the second hand tracking device HAD2 is being pressed. Therefore, there is a real time visual feedback of the modification of the distance DIS. When the user releases the button of the second hand tracking device HAD2, the distance DIS is considered to be fixed, until the user presses again the button.

Alternatively, the widening or thinning of the convex volume VOL can be implemented with an "on/off" command: the user presses, then releases a button of the second hand tracking device HAD2, so as to activate the function of modifying the width of the convex volume VOL. The widening or thinning of the convex volume VOL is carried out after receiving another command of pressing then releasing the button. Thus, between two switches of the button, the user can annotate an object which is visible thanks to the ghosting or hiding of the objects which are in the field of view of the virtual camera, which may be useful in an authoring process.

Figure 4:
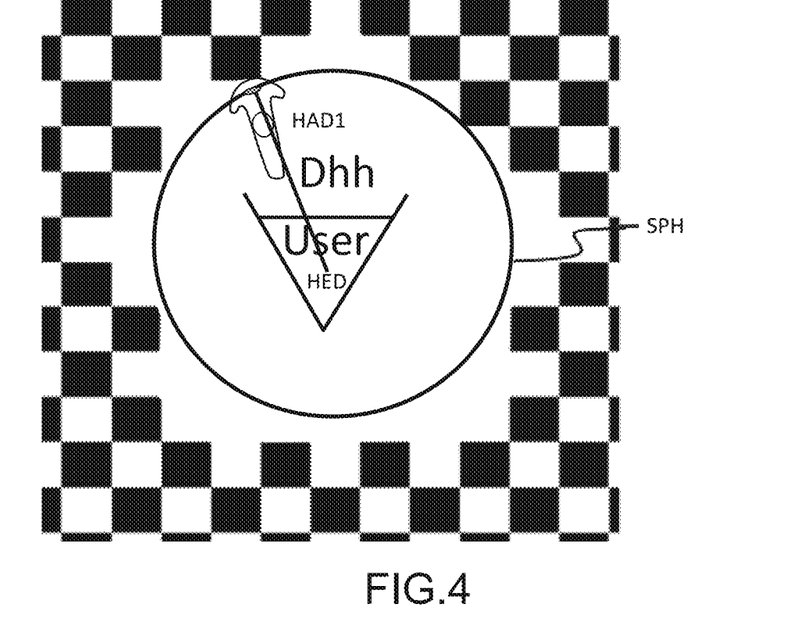
FIGS. 4 and 5 illustrate a top view of the user in an immersive environment, in which the region is a sphere.
Figure 5:
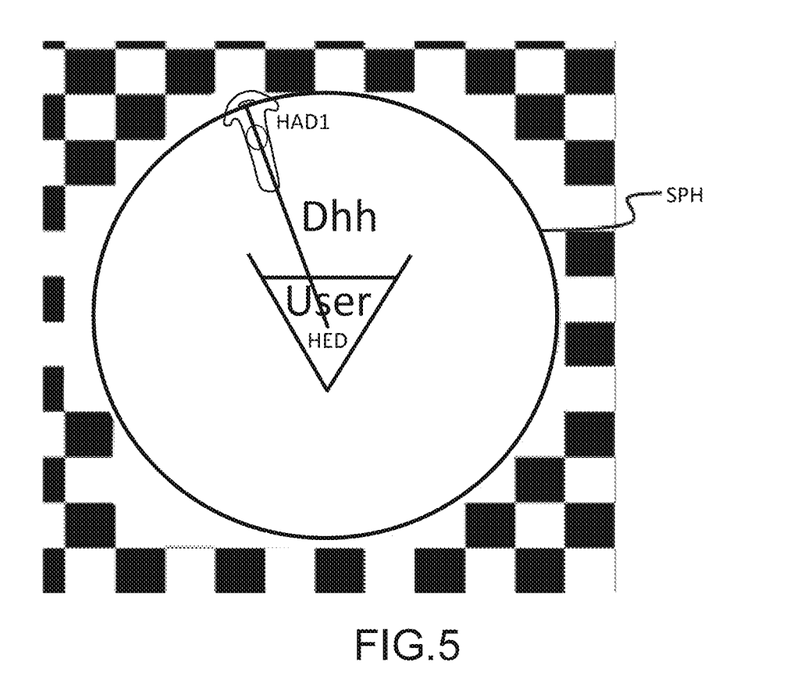

According to an embodiment, illustrated by FIGS. 4 and 5, the region where the rendering is modified may be a user-centered sphere, which has a radius equal to the distance between the 3D position of the head tracking device HED and the 3D position of the first hand tracking device HAD1. For example, all the objects which are in the sphere are ghosted or hidden. Consequently, the user does not need to move his hand in order to explore an object from a side to another, since he just has to move of his head.

This configuration may also be interesting when the real environment of the user is congested in front of him, for example because of the computer screen. If the user is aware that his lateral environment is free, he can adjust the radius of the sphere by extending or contracting his arm.

When the user has the first hand tracking device HAD1 and the second hand tracking device HAD2 in his hands, he increases the distance DIS with one of the aforementioned methods. When the distance DIS exceeds a threshold distance the convex 3D volume VOL, which may be initially a truncated cone or a revolution cylinder, is transformed into a sphere SPH. The center of the sphere SPH is located at the 3D position of the head tracking device HED, and the radius Dhh is equal to the distance between the 3D position of the head tracking device HED and the 3D position of the first hand tracking device HAD1.

The user can switch again to the non-spherical shape by providing an input to the second hand tracking device HAD2, for example by pressing a button of the second hand tracking device HAD2.

Advantageously, the region where the rendering is modified comprises also 3D objects which have a minimum bounding box which intersects with the convex volume VOL. It is illustrated by FIGS. 1 to 5: around the convex volume VOL, the boxes of the checkerboard pattern which intersect with the convex volume VOL are also ghosted/hidden. Therefore, an object (or a part of it) is not cut: it is either ghosted/hidden, or it is rendered.

Figure 6:
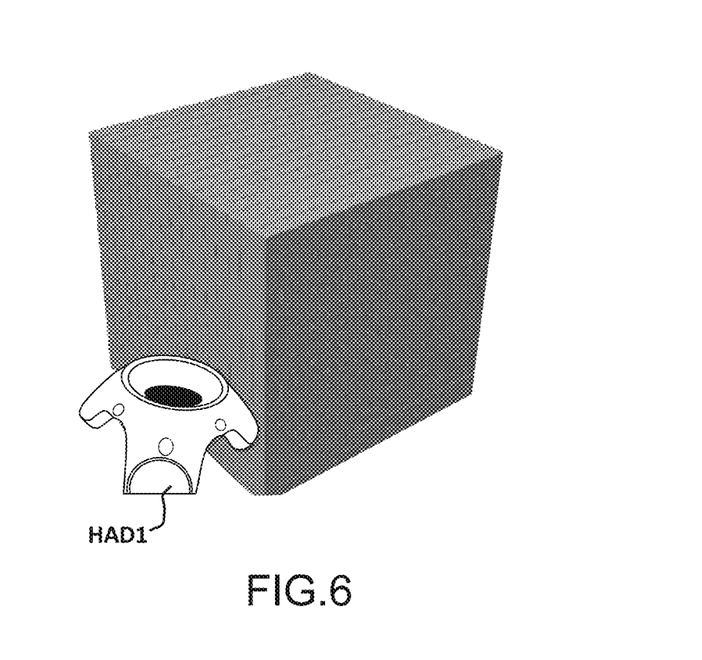
FIGS. 6 and 7 illustrate the viewpoint of a user when exploring an object, thanks the method according to the invention.
Figure 7:
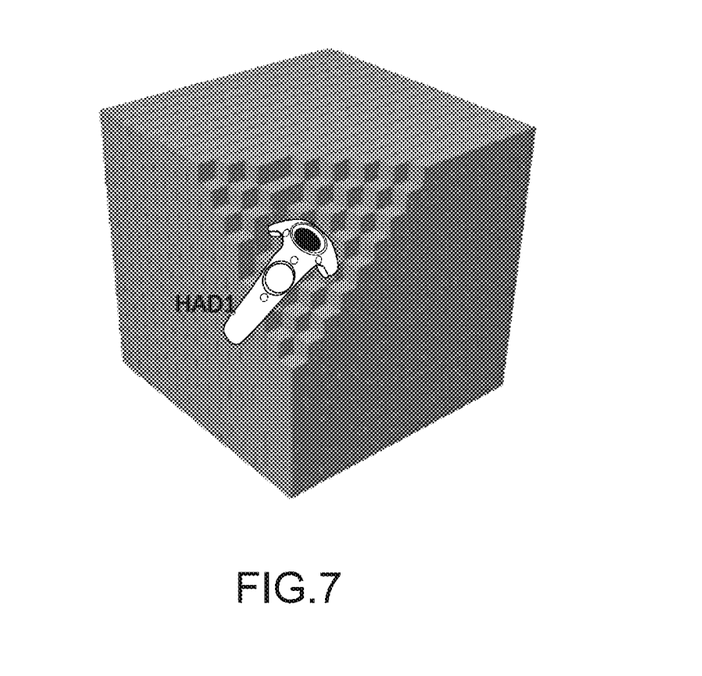

FIGS. 6 and 7 illustrate the viewpoint of a user when exploring an object, thanks the method according to an embodiment. FIG. 6 illustrates the viewpoint before exploring the object, in this case a cube. In FIG. 7, the user outstretches his arm, and "digs" in the cube, so the dug part of the cube is hidden.

It has been shown that the disclosure is particularly tailored to an immersive environment, since the user only needs to interact with the controllers of the virtual reality system, without using other peripherals such as the keyboard or the mouse. Moreover, the invented method is user friendly, since the user does not have to memorize specific buttons.

The inventive method can be performed by a suitably-programmed general-purpose computer or virtual reality system, possibly including a computer network, storing a suitable program in non-volatile form on a computer-readable medium such as a hard disk, a solid state disk or a CD-ROM and executing said program using its microprocessor(s) and memory.

Figure 8:
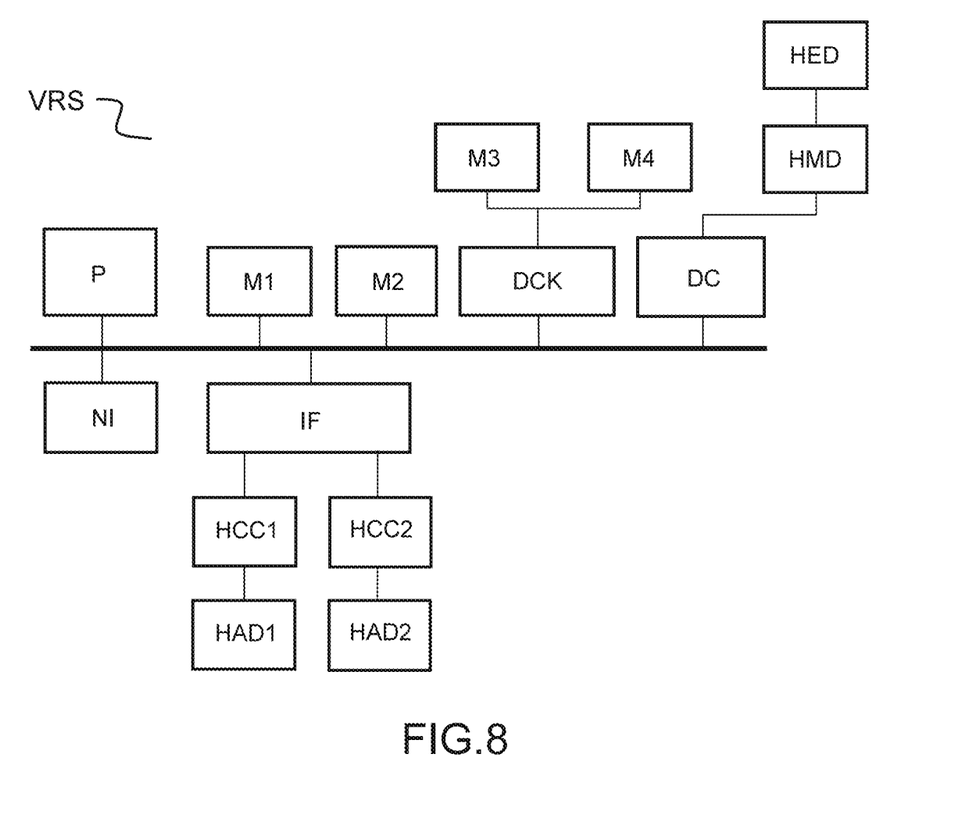
FIG. 8 illustrates a computer environment which is adapted to carry out the method according to the invention.

A computer CPT suitable for carrying out a method according to an exemplary embodiment is described with reference to FIG. 8. In FIG. 8, the virtual reality system VRS includes a Central Processing Unit (CPU) P which performs the method step described above while running an executable program, i.e. a set of computer-readable instructions, stored in a memory device such as RAM M1 or ROM M2 or hard disk drive (HDD) M3, DVD/CD drive M4, or stored remotely.

The claimed invention is not limited by the form of the computer-readable media on which the computer-readable instructions and/or the data structure of the inventive process are stored. For example, the instructions and files can be stored on CDs, DVDs, in FLASH memory, RAM, ROM, PROM, EPROM, EEPROM, hard disk or any other information processing device with which the computer communicates, such as a server or computer. The program and the files can be stored on a same memory device or on different memory devices.

Further, a computer program suitable for carrying out the inventive method can be provided as a utility application, background daemon, or component of an operating system, or combination thereof, executing in conjunction with CPU P and an operating system such as Microsoft VISTA, Microsoft Windows 10, UNIX, Solaris, LINUX, Apple MAC-OS and other systems known to those skilled in the art.

CPU P can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The virtual reality system in FIG. 8 also includes a network interface NI, such as an Intel Ethernet PRO network interface card from Intel Corporation of America, for interfacing with a network, such as a local area network (LAN), wide area network (WAN), the Internet and the like. The virtual reality system further includes a head mounted display device HMD having a head tracking device HED. A general purpose I/O interface IF interfaces with hand held controllers HHC1, HHC2 which are respectively equipped with hand tracking devices HAD1, HAD2. The display, the keyboard and the pointing device, together with the display controller and the I/O interfaces, form a graphical user interface, used by the user to provide input commands and by the computer for displaying the 3D objects.

Disk controller DKC connects HDD M3 and DVD/CD M4 with communication bus CBS, which can be an ISA, EISA, VESA, PCI, or similar, for interconnecting all of the components of the computer.

Any method steps described herein should be understood as representing modules, segments, or portions of code which include one or more executable instructions for implementing specific logical functions or steps in the process, and alternate implementations are included within the scope of the exemplary embodiment.

The invention claimed is:

1. A computer-implemented method for modifying a rendering of a region of a 3D scene in an immersive environment, comprising:
    computing the region based on a 3D position of a head tracking device and a 3D position of at least one hand tracking device, wherein the region comprises a convex volume which has a plane part which fits a near clipping plane of a virtual camera frustum rendering a part of the 3D scene, said convex volume extending along a segment which is defined by the 3D position of the head tracking device and by the 3D position of the hand tracking device; and modifying the rendering of the region of the 3D scene in the immersive environment, wherein modifying the rendering of the region comprises ghosting or hiding said region.

2. The computer-implemented method of claim 1, wherein the convex volume includes a truncated cone or a revolution cylinder.

3. The computer-implemented method of claim 2, wherein the convex volume has a curved shape surrounding partially the hand tracking device, opposite to the plane part, and being spaced apart from the hand tracking device by a non-null safety margin.

4. The computer-implemented method of claim 2, further comprising:

receiving a user input of actuating the hand tracking device; and modifying the rendering of the region as long as the hand tracking device is being actuated.

5. The computer-implemented method of claim 2, further comprising:

receiving a user input of actuating a second hand tracking device;

computing a distance between a 3D position of a first hand tracking device of the at least one hand tracking device, and a 3D position of the second hand tracking device; and widening or thinning the convex volume across the segment, respectively by increasing or reducing said distance.

6. The computer-implemented method of claim 1, wherein the convex volume has a curved shape surrounding partially the hand tracking device, opposite to the plane part, and being spaced apart from the hand tracking device by a non-null safety margin.

7. The computer-implemented method of claim 6, further comprising:

receiving a user input of actuating the hand tracking device; and modifying the rendering of the region as long as the hand tracking device is being actuated.

8. The computer-implemented method of claim 6, further comprising:

receiving a user input of actuating a second hand tracking device;

computing a distance between a 3D position of a first hand tracking device of the at least one hand tracking device, and a 3D position of the second hand tracking device; and widening or thinning the convex volume across the segment, respectively by increasing or reducing said distance.

9. The computer-implemented method of claim 1, further comprising:

receiving a user input of actuating the hand tracking device; and modifying the rendering of the region as long as the hand tracking device is being actuated.

10. The computer-implemented method of claim 1, further comprising:

receiving a user input of actuating a second hand tracking device;

computing a distance between a 3D position of a first hand tracking device of the at least one hand tracking device, and a 3D position of the second hand tracking device; and widening or thinning the convex volume across the segment, respectively by increasing or reducing said distance.

11. The computer-implemented method of claim 10, wherein:

the receiving the user input of actuating the second hand tracking device further includes receiving a command of pressing and holding a button of the second hand tracking device, and the widening or thinning the convex volume is carried out while the button of the second hand tracking device is being pressed.

12. The computer-implemented method of claim 10, wherein:

the receiving the user input of actuating the second hand tracking device further includes receiving a command of pressing then releasing a button of the second hand tracking device, and the widening or thinning the convex volume is carried out after receiving another command of pressing then releasing said button.

13. The computer-implemented method of claim 10, wherein the convex volume is transformed into a sphere if a distance between the 3D position of the first hand tracking device and the 3D position of the second hand tracking device exceeds a threshold distance, said sphere having a center at the 3D position of the head tracking device, and having a radius equal to the distance between the 3D position of the head tracking device and the 3D position of the first hand tracking device.

14. The computer-implemented method of claim 1, wherein the region includes 3D objects having a minimum bounding box which intersects with the convex volume.

15. The computer-implemented method of claim 1, further comprising:

receiving a user input of actuating the hand tracking device; and modifying the rendering of the region as long as the hand tracking device is being actuated.

16. A non-transitory computer-readable data-storage medium containing computer-executable instructions that when executed by a virtual reality system causes the virtual reality system to implement a method for modifying a rendering of a region of a 3D scene in an immersive environment, the method comprising:

computing the region based on a 3D position of a head tracking device and a 3D position of at least one hand tracking device, wherein the region comprises a convex volume which has a plane part which fits a near clipping plane of a virtual camera frustum rendering a part of the 3D scene, said convex volume extending along a segment which is defined by the 3D position of the head tracking device and by the 3D position of the hand tracking device; and modifying the rendering of the region of the 3D scene in the immersive environment, wherein modifying the rendering of the region comprises ghosting or hiding said region.

17. A virtual reality system (VRS) comprising:

a head mounted display device having a head tracking device;

at least one hand-held controller having a hand tracking device; and a processor coupled to a memory,
wherein the memory stores computer-executable instructions to cause the processor to be configured to:
compute a region based on a 3D position of the head tracking device and a 3D position of the hand tracking device, wherein the region comprises a convex volume which has a plane part which fits a near clipping plane of a virtual camera frustum rendering a part of a 3D scene, said convex volume extending along a segment which is defined by the 3D position of the head tracking device and by the 3D position of the hand tracking device; and
modify a rendering of the region of a 3D scene in an immersive environment, wherein modifying the rendering of the region comprises ghosting or hiding said region.

* * * * *